(12) United States Patent  
Arcella et al.

(10) Patent No.: US 8,232,012 B2  
(45) Date of Patent: Jul. 31, 2012

(54) PROCESS FOR OPERATING A FUEL CELL IN DRY CONDITIONS

(75) Inventors: Vincenzo Arcella, Milan (IT); Alessandro Ghielmi, Milan (IT); Luca Merlo, Montorfano (IT)

(73) Assignee: Solvay Solexis S.p.A., Bollate (IT)

( * ) Notice: Subject to any disclaimer, the term of this patent is extended or adjusted under 35 U.S.C. 154(b) by 488 days.

(21) Appl. No.: 12/520,017

(22) PCT Filed: Dec. 20, 2007

(86) PCT No.: PCT/EP2007/064360  
§ 371 (c)(1),  
(2), (4) Date: Jun. 18, 2009

(87) PCT Pub. No.: WO2008/077894  
PCT Pub. Date: Jul. 3, 2008

(65) Prior Publication Data  
US 2010/0040912 A1    Feb. 18, 2010

(30) Foreign Application Priority Data  
Dec. 22, 2006   (EP) .................................. 06127155

(51) Int. Cl.  
*H01M 8/10* (2006.01)

(52) U.S. Cl. .................. 429/413; 429/450; 429/494

(58) Field of Classification Search .............. None  
See application file for complete search history.

(56) References Cited

U.S. PATENT DOCUMENTS  
4,433,082 A    2/1984 Grot  
(Continued)

FOREIGN PATENT DOCUMENTS  
EP    1179548 A1    2/2002  
(Continued)

OTHER PUBLICATIONS

Hogarth WHJ & Benziger JB, "High Performance Dry Feed Hydrogen PEMFCS: Understanding the Water Balance as a Design Tool for Novel Polymer Membranes"—Prep. Pap.-American Chemical Society, Division Fuel Chemistry—2005, vol. 50, Issue 2, p. 490-491 (2 pp.).

(Continued)

*Primary Examiner* — Jonathan Crepeau  
(74) *Attorney, Agent, or Firm* — Arent Fox LLP

(57) ABSTRACT

The invention pertains to a process for operating a polymer electrolyte membrane fuel cell (PEMFC), said PEMFC comprising:

Figure 1:
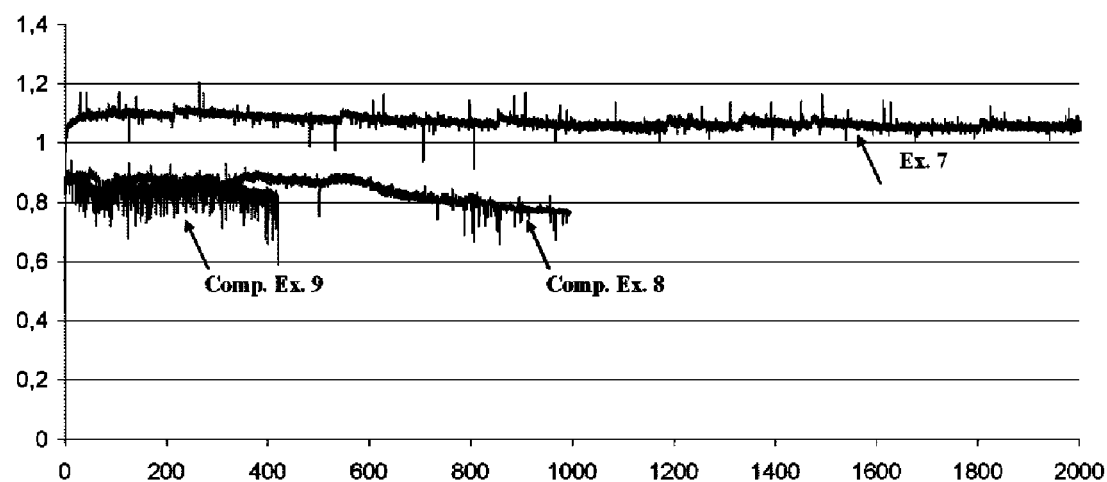

(a) a membrane comprising at least one fluorinated ionomer [polymer (I)] comprising recurring units derived from tetrafluoroethylene (TFE) and from at least one monomer of formula (M):

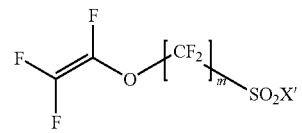

(M)

wherein m is an integer between 1 and 6 and X' is chosen among halogens (Cl, F, Br, I), —O⁻M⁺, wherein M⁺ is a cation selected among $H^+$, $NH_4^+$, $K^+$, $Li^+$, $Na^+$, or mixtures thereof, said polymer (I) having an equivalent weight (EW) of from 700 to 850 g/eq.;

(b) a cathode;  
(c) an anode;  
said process comprising:

(i) feeding gaseous reactants at the electrodes at a relative humidity of at most 66%;  
(ii) maintaining an average current density between 0.05 and 1.5 A/cm²; and  
(iii) maintaining an average temperature of more than 65° C.

9 Claims, 2 Drawing Sheets

U.S. PATENT DOCUMENTS

| | | | |
|---|---|---|---|
| 7,041,409 | B2 | 5/2006 | Wu et al. |
| 7,094,851 | B2 | 8/2006 | Wu et al. |
| 2001/0004501 | A1 | 6/2001 | Yi et al. |
| 2005/0031924 | A1 | 2/2005 | Shirono et al. |
| 2006/0099476 | A1 | 5/2006 | Watakabe et al. |

FOREIGN PATENT DOCUMENTS

| | | | |
|---|---|---|---|
| EP | 1416561 | A2 | 5/2004 |
| EP | 1589062 | A2 | 10/2005 |
| EP | 1901378 | A1 | 3/2008 |

OTHER PUBLICATIONS

Qi Z & Kaufman A,. "PEM Fuel Cell Stacks Operated Under Dry-Reactant Conditions", Journal of Power Sources, 2002, vol. 109, p. 469-476 (8 pp.).

Arcella V., Ghielmi A. & Tommasi G., "High performance Perfluoropolymer Films and Membranes", Ann. N.Y. Acad. Sci—2003, vol. 984, p. 226-244 (29 pp.).

Sang-Yeoul A., et al., "Effect of the ionomers in the electrode on the performance of PEMFC under non-humidifying conditions", Electrochimica Acta—2004, vol. 50, p. 673-676 (4 pp.).

Arico A.S., Baglio V., Di Blasi A., Antonucci V., Cirillo L., Ghielmi A., Arcella V., "High temperature direct methanol fuel cells based on short side chain perfluorinated ionomer membranes", 209th ECS Meeting—Denver Colorado, May 7-12, 2006—Abstract No. 1134 (1 p.).

Yang C. et al, "A comparison of physical properties and fuel cell performance of Nafion and zirconium phosphate/Nafion composite membranes", Journal of Membrane Science—(2004), vol. 237, p. 145-161 (17 pp.).

Yang B, Fu YZ, & Manthiram A. "Operation of Thin Nafion-Based Self-Humidifying Membranes in Proton Exchange Membrane Fuel Cells With Dry H2 and O2", Journal of Power Sources—(2005), vol. 139, p. 170-175 (6 pp.).

U.S. Appl. No. 12/445,420, Arcella V. et al., filed Oct. 16, 2007, Apr. 13, 2009.

PROCESS FOR OPERATING A FUEL CELL IN DRY CONDITIONS

CROSS-REFERENCE TO RELATED APPLICATIONS

The present application is a U.S. national stage application under 35 U.S.C. §371 of International Application No. PCT/EP2007/064360 filed Dec. 20, 2007, which claims the priority benefit to European Patent Application Serial no. 06127155.7 filed on Dec. 22, 2006, these applications being incorporated herein by reference in their entirety for all purposes.

TECHNICAL FIELD

The invention pertains to a process for operating a fuel cell, in particular to a process for operating a polymer electrolyte membrane fuel cell in dry conditions.

BACKGROUND ART

Fuel cells are emerging as practical and versatile power sources, which can be more efficient and less environmentally damaging than rival technologies. From mobile phones and electrical vehicles to spacecraft and multi-megawatt power stations, the application potential for fuel cells is growing rapidly. Fuel cells have much in common with batteries, which also convert energy that is stored in chemical form into electricity. In contrast to batteries, however, they oxidize externally supplied fuel and therefore do not have to be recharged.

Fuel cell operated electric vehicles are today visualized as the way to meet growing human mobility requirements worldwide, replacing fossil fuels in the distant future and assuring a more environmental-sustainable approach to mobility.

Fuel cells can be configured in numerous ways with a variety of electrolytes, fuels and operating temperatures. For example, fuels such as hydrogen or methanol can be provided directly to the fuel cell electrode or fuels such as methane or methanol can be converted to a hydrogen rich gas mixture external to the cell itself (fuel reforming) and subsequently provided to the fuel cell. Air is the source of oxygen in most fuel cells, although in some applications, the oxygen is obtained by hydrogen peroxide decomposition or from a cryogenic storage system.

Although there are theoretically a limitless number of combinations of electrolyte, fuel, oxidant, temperatures and so on, practical systems are in many cases based on polymer electrolyte membrane fuel cell (PEMFC) technology, characterized by solid polymer electrolyte systems using hydrogen as the fuel source and oxygen or air as the oxidant. Further, the PEMFC can be miniaturized as compared with other types of fuel cells and is suitable as mobile power source or as small capacity power source.

The polymer electrolyte membrane forming the heart of the PEMFC acts as a proton-exchange membrane, and must have excellent ion conductivity, physical strength, gas barrier properties, chemical stability, electrochemical stability and thermal stability at the operating conditions of the fuel cell.

Actually, the electrode reactions taking place in a hydrogen PEMFC are:
Anode Reaction:

$$H_2 \rightarrow 2H^+ + 2e^-$$

Cathode Reaction:

$$\tfrac{1}{2}O_2 + 2H^+ + 2e^- \rightarrow H_2O$$

Yielding as Overall Electrochemical Reaction:

$$H_2 + \tfrac{1}{2}O_2 \rightarrow H_2O.$$

As one of the critical features of a PEMFC is to maintain a high water-content in the membrane to assure acceptable ion conductivity, water management in the membrane is critical for efficient performances; the PEMFC must operate in conditions wherein the by-product water does not evaporate faster than it is produced. The water content of a PEMFC is determined by the balance of water or its transport during the reactive mode of operation. Water-transport processes are a function, notably, of the current and the properties of both the membrane and the electrodes (permeability, thickness, etc.). Influencing the water transport are the water drag through the cell, back diffusion from the cathode (most of the product water is traditionally removed from the cathode, where it is produced, by excess flow of oxidant gas), and the diffusion of any water (either by-product or supplied as moisture in reactants) in the membranes.

Most of the car manufacturers are today driving the development of fuel cell cars based on the use of dry reactants (air and hydrogen) and high operating temperatures aiming at fuel cell system (stack and auxiliaries) simplification and reduction of steric hindrance of the same.

Nevertheless, among PEMFC components, the ionomeric membrane is the weak component most sensitive against operations simultaneously at high temperature and with dry reactants.

Membranes currently used in PEMFC are perfluorinated sulfonic acid (PFSA) polymers such as NAFION® resins from DuPont. Even if such membranes have demonstrated good performances, appreciable long-term stability in both oxidative and reductive environments and valuable protonic conductivity under fully hydrated conditions (80-100% relative humidity, RH hereafter), they are limited to low temperatures (up to 80° C.), require a sophisticated water management (system complexity), and due to limited stability in limited hydration and high temperature conditions, are unpractical from a durability point of view.

For instance, EP 1589062 (SOLVAY SOLEXIS S.P.A.) 26/10/2005, discloses ionomeric membranes comprising (per)fluorinated ionomers suitable for being in fuel cells under fully hydrated conditions.

Great efforts have been made in academic and industrial laboratories to deliver proton exchange membranes for hydrogen-based fuel cells able to operate in so-called "dry conditions", i.e. without the need of sophisticated water management systems, and/or at temperatures up to 120° C.

Within this scenario, U.S. Pat. No. 7,094,851 (GORE ENTERPRISE HOLDINGS, INC.) 22 Aug. 2006 discloses ionomers having low equivalent weight (typically between 625 and 850 g/eq), high conductivity (greater than 0.13 S/cm) capable of being processed into thin film and are extremely well-suited for low humidity or high temperature fuel cell applications. Nevertheless, ionomers hereby described comprising recurring units derived from tetrafluoroethylene (TFE) and from a comonomer of formula (A):

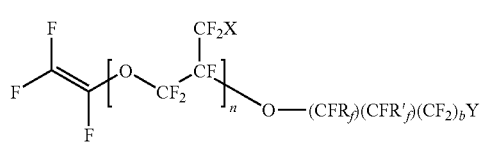
(A)

wherein X is F, Cl or Br or mixtures thereof; n is an integer equal to one or two; $R_f$ and $R'_f$ are independently selected from the group of F, Cl, perfluoroalkyl radical, and chloroperfluoroalkyl radical; Y is an acid group or a functional group convertible to an acid group, like notably —$SO_3Z$, with Z being H or any combination of cations; a is zero or an integer greater than zero; and b is an integer greater than zero, are known to possess poor temperature resistance, so that membranes prepared therefrom cannot withstand long-life PEMFC operations at temperatures exceeding 65° C.

Similarly, U.S. Pat. No. 7,041,409 (GORE ENTERPRISE HOLDINGS, INC.) 9 May 2006 discloses fluorinated ionomeric co-polymers comprising:
(a) a substantially fluorinated backbone;
(b) pendant groups derived from an ionomeric monomer of the formula (A)

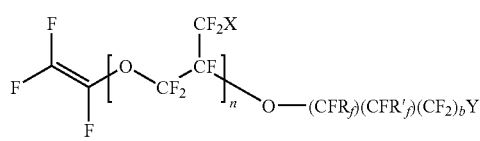
(A)

wherein X is F, Cl or Br or mixtures thereof; n is an integer from zero to two; $R_f$ and $R'_f$ are independently selected from the group of F, Cl, perfluoroalkyl radical, and chloroperfluoroalkyl radical; Y is an acid group or a functional group convertible to an acid group, like notably —$SO_3Z$, with Z being H or any combination of cations; a is zero or an integer greater than zero; and b is an integer greater than zero; and
(c) pendant groups derived from a vinyl ether monomer that has at least two vinyl ether groups of the form, $CA_2$=CB—O—, where the vinyl groups are separated by greater than four atoms; A is independently selected from the group containing F, Cl, and H; and B is independently selected from F, Cl, H and ORi, where Ri is a branched or straight chain alkane that may be partially, substantially or completely fluorinated or chlorinated,
said copolymers being particularly well-suited for low humidity of high temperature fuel cell operations. Nevertheless, such ionomers exhibit limited durability in high temperature PEMFC operations, i.e. at temperatures exceeding 65° C.

There is still a need in the art for a PEMFC comprising a fluoroionomer membrane able to sustain operations in dry conditions (i.e. operating with reactants having low dew point) while maintaining outstanding energetic performances (efficiency) and durability.

DISCLOSURE OF INVENTION

It is thus an object of the invention a process for operating a polymer electrolyte membrane fuel cell (PEMFC), said PEMFC comprising:

(a) a membrane comprising at least one fluorinated ionomer [polymer (I)] comprising recurring units derived from tetrafluoroethylene (TFE) and from at least one monomer of formula (M):

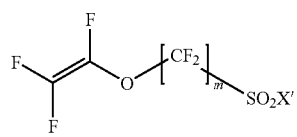
(M)

wherein m is an integer between 1 and 6 and X' is chosen among halogens (Cl, F, Br, I), —$O^-M^+$, wherein $M^+$ is a cation selected among $H^+$, $NH_4^+$, $K^+$, $Li^+$, $Na^+$, or mixtures thereof, said polymer (I) having an equivalent weight (EW) of from 700 to 850 g/eq.;
(b) a cathode;
(c) an anode;
said process comprising:
(i) feeding gaseous reactants at the electrodes at a relative humidity of at most 66%;
(ii) maintaining an average current density between 0.05 and 1.5 A/cm²; and
(iii) maintaining an average temperature of more than 65° C.

It has been surprisingly found that a PEMFC comprising a membrane as above detailed and operated in above mentioned conditions can withstand long-life operating conditions with no need of complicated water management.

The Applicant thinks, without this limiting the scope of its invention, that the proper combination of the use of a membrane made from a fluorinated ionomer possessing outstanding thermal resistance, durability, suitable EW and intrinsic permeability and appropriate PEMFC operating conditions that makes it possible to maintain appropriate humidification in the device so that long-life operations with dry or nearly-dry reactants are possible even at high temperature.

Within the context of the present invention the mention "at least one fluorinated ionomer" is intended to denote one or more than one polymer (I). Mixtures of polymers (I) can be advantageously used for the purposes of the invention.

Also, within the context of the present invention the mention "at least one monomer of formula (M)" is intended to denote one or more than one monomer (M). Mixtures of monomers (M) can be advantageously used for the purposes of the invention.

Optionally, the polymer (I) may comprise, in addition to recurring units derived from TFE and monomer (M), recurring units derived from at least one other monomer [comonomer (CM), hereinafter].

Hereinafter, the term comonomer (CM) should be intended to encompass both one comonomer and two or more comonomers.

The comonomer (CM) can notably be either hydrogenated (i.e. free of fluorine atom) [comonomer (HCM), hereinafter] or fluorinated (i.e. containing at least one fluorine atom) [comonomer (FCM), hereinafter].

Non limitative examples of suitable hydrogenated comonomers (HCM) are notably ethylene, propylene, vinyl monomers such as vinyl acetate, acrylic monomers, like methyl methacrylate, acrylic acid, methacrylic acid and hydroxyethyl acrylate, as well as styrene monomers, like styrene and p-methylstyrene.

Non limitative examples of suitable fluorinated comonomers (FCM) are notably:

$C_3$-$C_8$ fluoro- and/or perfluoroolefins, such as hexafluoropropene, pentafluoropropylene, and hexafluoroisobutylene;

$C_2$-$C_8$ hydrogenated monofluoroolefins, such as vinyl fluoride;

1,2-difluoroethylene, vinylidene fluoride and trifluoroethylene;

perfluoroalkylethylenes complying with formula $CH_2=CH-R_{f0}$, in which $R_{f0}$ is a $C_1$-$C_6$ perfluoroalkyl;

chloro- and/or bromo- and/or iodo-$C_2$-$C_6$ fluoroolefins, like chlorotrifluoroethylene;

fluoroalkylvinylethers complying with formula $CF_2=CFOR_{f1}$ in which $R_{f1}$ is a $C_1$-$C_6$ fluoro- or perfluoroalkyl, e.g. $-CF_3$, $-C_2F_5$, $-C_3F_7$;

fluoro-oxyalkylvinylethers complying with formula $CF_2=CFOX_0$, in which $X_0$ is a $C_1$-$C_{12}$ oxyalkyl, or a $C_1$-$C_{12}$ (per)fluorooxyalkyl having one or more ether groups, like perfluoro-2-propoxy-propyl;

fluoroalkyl-methoxy-vinylethers complying with formula $CF_2=CFOCF_2 OR_{f2}$ in which $R_{f2}$ is a $C_1$-$C_6$ fluoro- or perfluoroalkyl, e.g. $-CF_3$, $-C_2F_5$, $-C_3F_7$ or a $C_1$-$C_6$ (per)fluorooxyalkyl having one or more ether groups, like $-C_2F_5-O-CF_3$;

fluorodioxoles, of formula:

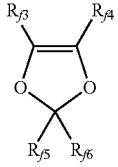

wherein each of $R_{f3}$, $R_{f4}$, $R_{f5}$, $R_{f6}$, equal or different each other, is independently a fluorine atom, a $C_1$-$C_6$ fluoro- or per(halo)fluoroalkyl, optionally comprising one or more oxygen atom, e.g. $-CF_3$, $-C_2F_5$, $-C_3F_7$, $-OCF_3$, $-OCF_2CF_2OCF_3$.

Should the polymer (I) comprise recurring units derived from a comonomer (CM), said comonomer (CM) is preferably a per(halo)fluorocomonomer, i.e. a fluorinated comonomer (FCM) as above detailed which is free from hydrogen atoms. Preferred per(halo)fluorocomonomers are notably chosen among:

$C_3$-$C_8$ perfluoroolefins, preferably hexafluoropropylene (HFP);

chloro- and/or bromo- and/or iodo-$C_2$-$C_6$ per(halo)fluoroolefins, like chlorotrifluoroethylene (CTFE) and/or bromotrifluoroethylene;

perfluoroalkylvinylethers (PAVE) complying with formula $CF_2=CFOR_{f1}$ in which $R_{f1}$ is a $C_1$-$C_6$ perfluoroalkyl, e.g. $-CF_3$, $-C_2F_5$, $-C_3F_7$;

perfluoro-oxyalkylvinylethers complying with formula $CF_2=CFOX_0$, in which $X_0$ is a $C_1$-$C_{12}$ perfluorooxyalkyl having one or more ether groups, like perfluoro-2-propoxy-propyl.

Optionally, in addition to recurring units derived from tetrafluoroethylene and monomer (M) as above specified, the polymer (I) can further comprise recurring units derived from at least one bis-olefin chosen among those of formulae:

(OF-1)

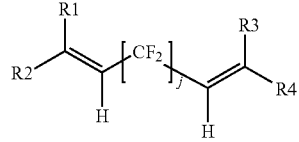

wherein j is an integer between 2 and 10, preferably between 4 and 8, and R1, R2, R3, R4, equal or different from each other, are H, F or $C_{1-5}$ alkyl or (per)fluoroalkyl group;

(OF-2)

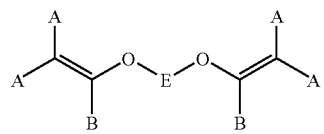

wherein each of A, equal or different from each other and at each occurrence, is independently selected from F, Cl, and H; each of B, equal or different from each other and at each occurrence, is independently selected from F, Cl, H and $OR_B$, wherein $R_B$ is a branched or straight chain alkyl radical which can be partially, substantially pr completely fluorinated or chlorinated; E is a divalent group having 2 to 10 carbon atom, optionally fluorinated, which may be inserted with ether linkages; preferably E is a $-(CF_2)_m-$ group, with m being an integer from 3 to 5; a preferred bis-olefin of (OF-2) type is $F_2C=CF-O-(CF_2)_5-O-CF=CF_2$.

(OF-3)

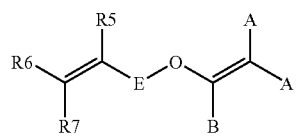

wherein E, A and B have the same meaning as above defined; R5, R6, R7, equal or different from each other, are H, F or $C_{1-5}$ alkyl or (per)fluoroalkyl group.

Should the polymer (I) comprise recurring units derived from a bis-olefin as above defined, it advantageously comprises said recurring units in an amount in the range from 0.01 to 5% by moles, with respect to all recurring units of polymer (I).

The polymer (I) advantageously comprise a substantial amount of recurring units derived from the monomer (M). The term "substantial amount" in the definition here above is intended to denote an amount of recurring units derived from the functional monomer which is effective to modify the polymer in its properties. Generally, a substantial amount is of at least 1% by moles, based on the total moles of recurring units.

Polymer (I) comprises recurring units derived from the monomer (M) in an amount of preferably at least 2%, more preferably at least 3% by moles, even more preferably at least 5% by moles.

Polymer (I) comprises recurring units derived from the monomer (M) in an amount of preferably at most 30%, more preferably at most 25% by moles, even more preferably at most 20% by moles.

Monomer (M) is preferably in its acid form, that is to say at least a part (preferably all) of groups X' are —O⁻H⁺.

The polymer (I) is preferably a tetrafluoroethylene (TFE) copolymer comprising (preferably consisting essentially of) recurring units derived from TFE and from a monomer of formula (M1):

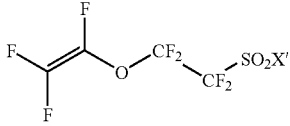

(M1)

wherein X' is chosen among halogens (Cl, F, Br, I), —O⁻M⁺, wherein M⁺ is a cation selected among H⁺, NH₄⁺, K⁺, Li⁺, Na⁺, or mixtures thereof. Recurring units derived from a monomer of formula (M1) are preferably derived from perfluoro-5-sulphonylfluoride-3-oxa-1-pentene (also known as "SFVE").

Preferred polymers (I) are TFE copolymers comprising (preferably consisting essentially on:
  from 15 to 20% by moles of recurring units derived from at least one monomer of formula (M1), in its —SO₂F or —SO₂X" form, wherein X" is chosen among halogens (Cl, Br, I), —O-M⁺, wherein M⁺ is a cation selected among H⁺, NH₄⁺, K⁺, Li⁺, Na⁺, or mixtures thereof; preferably in its —SO₃H form; and
  from 85 to 80% by moles of recurring units derived from TFE.

Polymer (I) is advantageously semi-crystalline.

The term semi-crystalline is intended to denote a polymer (I) which possesses a detectable melting point. It is generally understood that a semi-crystalline polymer (I), when analyzed in its —SO₂F form, possesses a heat of fusion determined according to ASTM D 3418 of advantageously at least 0.4 J/g, preferably of at least 0.5 J/g, more preferably of at least 1 J/g.

Particularly good results have been obtained when the polymer (I) had a heat of fusion of from 4 to 8 J/g. Polymers (I) complying with such requirement were found to well behave in the process of the invention, thus efficiently providing for suitable membranes to be used in fuel cells operating in above defined conditions, i.e. at high temperature and low humidity.

It is generally understood that ionic conductivity of the membrane comprising polymer (I) is a function of the operating temperature, and of the hydration degree of the membrane itself. The Applicant thinks, without this limiting the scope of its invention, that only by the appropriate choice of both membrane properties and operating parameters it is possible to obtain sustainable and effective operations of the fuel cell with no need of complex water management systems.

It is essential for the purposes of the invention that the polymer (I) has an equivalent weight (EW) of from 700 to 850 g/eq. Polymer (I) possessing an equivalent weight comprised within such range provide a suitable compromise between need of retaining generated water and thus maximizing ionic conductivity of the membrane and requirements of suitable mechanical properties at temperatures exceeding 65° C., generally up to 100-130° C.

Actually, when the polymer (I) has an equivalent weight of more than 850 g/eq, it does not provide for an acceptable water affinity so that water generated during fuel cell operations can be kept within the membrane to provide for appropriate ionic conductivity, whereas the generation of water corresponds to the current density above defined. When the polymer (I) has an equivalent weight of less than 700 g/eq., it does not possess acceptable mechanical properties to be used in such conditions.

Polymer (I) has an equivalent weight (EW) of advantageously at most 850 g/eq, preferably at most 840 g/eq, more preferably at most 820 g/eq.

Polymer (I) has an equivalent weight (EW) of advantageously at least 700 g/eq, preferably at least 720 g/eq, more preferably at least 750 g/eq.

Equivalent weight of the polymer (I) can be determined according to well-known techniques. Generally, a weighted aliquot of the polymer (I) is compression moulded to yield a film, which is first completely hydrolyzed with a KOH solution in water and then treated with nitric acid. Polymer (I) is in this way converted from the precursor (—SO₂F) form to the acid (—SO₃H) form. Equivalent weight is thus determined by titration with a base.

The membrane of the PEMFC of the invention can consist essentially of the polymer (I) as above detailed or can comprise, in addition to polymer (I), other components, such as, for instance a support.

The membrane of the PEMFC of the invention has typically a thickness comprised between 10 and 60 µm. The Applicant has found that this range of thickness is particularly advantageous for the process of the invention, as it provides for a fair compromise between the required mechanical strength and resistance and the need of increasing water mobility throughout said thickness for transporting generated water from cathode to the anode. Membranes having lower thickness do not provide the necessary mechanical stability; on the contrary, membranes having higher thickness does not guarantee the water mobility required for sustaining the invention operating conditions.

The membrane can be fabricated according to the processes well-known to those skilled in the art. In particular any of extrusion-molding, casting, blow-molding can be used for manufacturing the membrane. Also, when the membrane is an impregnated membrane, suitable impregnation techniques can be adopted. Generally, in this latter case, a PTFE support is preferably used; a support which has been found to give outstanding result is a porous support made of expanded (or bi-stretched) PTFE.

The PEMFC of the process of the invention advantageously comprises a membrane, as above detailed, a cathode and an anode. It is understood that these three components might be separately assembled within the PEMFC or may be built as a so-called "membrane-electrode assembly", that is to say an assembly wherein the two faces of the membrane layer are respectively provided with electrode layers which adhere to said membrane layer.

Electrode layers of MEA are generally composed of a mixture of a catalyst and a polymeric binder, which is generally chosen among polymer (I) as above detailed.

Generally, the catalyst/polymeric binder weight ratio is comprised between 2:5 to 5:1. These limits advantageously guarantee good fuel cell performance. Even if more polymer binder compared to the catalyst might be used, the performances of the whole electrochemical package will be affected.

Catalyst preferably comprises Platinum. Pt load of the electrodes of the invention generally range between 0.05 and 1 mg/cm².

The PEMFC typically comprise, in addition to the membrane and the electrodes, one or more of the components listed here below:
- a gas diffusion layer (GDL) at the anode;
- a gas diffusion layer (GDL) at the cathode;
- bipolar plates to collect current from electrodes and distribute reactants to the GDL layers.

It is essential in the process of the invention to maintain an average current density between 0.05 and 1.5 A/cm$^2$. The term "average current density" is intended to denote the average value weighted on operating time of the instantaneous PEMFC operations. The process of the invention thus encompasses operations wherein current density is kept at a substantially constant value as well as operations wherein current density may vary as a function of time, with the provision that in any case the average current density is comprised between the boundaries defined herein above.

As well known to those skilled in the art, the amount of water generated during fuel cell operation is proportional to the current density of the same. When the current density is below 0.05 A/cm$^2$, amount of generated water is not sufficient to maintain a sufficient level of hydration of the membrane of polymer (I) having the EW as above defined. When the current density is above 1.5 A/cm$^2$, dissipation of the heat produced by overall electrodes reaction is not effective and local overheating phenomena impair the polymer (I) membrane.

The process of the invention will assure fuel cell operations when gaseous reactants fed at the electrodes possess a relative humidity of at most 66%. While relative humidity of gaseous reactants is not particularly limited, they will be generally fed to the electrodes at a relative humidity of less than 60%, preferably of less than 55%, more preferably of less than 45%, most preferably of less than 25%.

Relative humidity as referred herein is intended to denote the partial pressure of water vapour in the reactant gas stream divided by the equilibrium vapour pressure of water at the fuel cell operating temperature. The PEMFC operating temperature is intended as the temperature of the cathode side exhausts at the very exit of the fuel cell.

Relative humidity of such stream can be determined according to well-known methods, i.e. by sampling a specimen of such gaseous stream and determining either its dew point or its water content after condensation of water vapour contained therein.

Generally, the gaseous reactants stream fed to the anode is composed of hydrogen, optionally in admixture with suitable diluent gas; preferably pure hydrogen is fed to the anode.

The gaseous reactants stream fed to the cathode typically comprises oxygen. While pure oxygen can be used, it is generally preferred to supply to the cathode mixtures comprising oxygen and at least one inert gas, more preferably to supply air.

Gaseous reactants are fed to the electrodes in an amount which is generally at least equal to the stoichiometric amount required to provide for the average current density of the PEMFC.

Generally the average air stoichiometry will be comprised between 1.2 and 3.

The term "average air stoichiometry" is intended to denote the average molar ratio between the amount of oxygen fed to the electrode in the air flow and the amount of oxygen which is actually reacted according to the PEMFC reaction during PEMFC operations; this parameter is thus an indication of the excess of air supplied to the cathode.

It should be understood that when feeding to the cathode a flow of air yielding an average air stoichiometry of more than 3, air flow is generally responsible for moisture extraction which can deplete membrane from water generated.

On the contrary, when average air stoichiometry is below 1.2, efficiency of the fuel cell electrochemical reaction can be affected, so that at a given current density, voltage becomes unsatisfactory.

Typically the average hydrogen utilization is comprised between 0.25 and 1.

The term "average hydrogen utilization" is intended to denote the average molar ratio between the amount of hydrogen actually converted by the electrochemical reaction at the anode and the amount of hydrogen which is fed to the anode, during PEMFC operations; this parameter is thus an indication of the reciprocal of the excess of hydrogen supplied to the anode.

Even if increasing reactants pressure at the electrodes might provides benefits in membrane conductivity and PEMFC efficiency, it is preferred for the process of the invention not to exceed a maximum outlet pressure of reactants of 4 barA. When operating PEMFC at an outlet pressure of more than 4 barA, operations are more complicated, as the PEMFC, including all its gaskets, must be equipped to sustain such overpressure.

Minimum outlet pressure is not particularly limited. It is generally preferred that the outlet pressure is of at least 1 barA.

In this view it is also generally preferred that the maximum continuous period of time during which process is operated in OCV (open circuit voltage) conditions, i.e. when the drained current is zero, is below 10 minutes. In such OCV conditions, i.e. when instantaneous current density of the PEMFC is zero, there is substantially no water generation, while reactants streams at the electrode continue moisture extraction from the membrane. If the OCV conditions are kept for more than 10 minutes, the risk exists that the membrane loses its humidification level so that it cannot exhibit sustainable ionic conductivity to support further fuel cell operations.

It is essential in the process of the invention to maintain an average temperature of more than 65° C. This would enable significant simplification in PEMFC stack, thanks to minor cooling requirements and would enable taking full advantage of the increase of ionic conductivity of the membrane with temperature.

The term "average temperature" is understood to mean that in the process of the invention temperatures can be varied; e.g. when starting the PEMFC, the process of the invention might be operated at an instant temperature of less than 65° C. Nevertheless, the average temperature in PEMFC operations will be of more than 65° C.

Operating temperature in a PEMFC is typically determined by measuring temperature of the exhaust gas stream exiting the cathode side of the PEMFC.

The process of the invention operates the PEMFC maintaining an average temperature of advantageously at most 130° C., preferably at most 125° C., more preferably at most 120° C.

As the PEMFC is submitted, in particularly during its start-up, to drastic changes in temperature, it can be important for the ratio between the resistance of the membrane at −20° C. divided by the resistance of the same at 80° C. at a relative humidity of 60% being advantageously comprised between 2 and 15, preferably between 3 and 10.

When the membrane possesses a resistance ratio as above detailed, the process of the invention can be advantageously operated with no need of pre-heating means for increasing temperature of the stack during start-up.

The invention will be explained in more detail with reference to the following examples whose purpose is merely illustrative and not limiting the scope of the invention.

EXAMPLE 1

Manufacture of a Polymer (I) Having an Equivalent Weight of 800 g/eq

In a 22 liters autoclave the following reagents were charged:
11.5 liters of demineralized water;
980 g of the monomer with formula: $CF_2\!=\!CF\!-\!O\!-\!CF_2CF_2\!-\!SO_2F$
3100 g of a 5% weight solution of $CF_2ClO(CF_2CF(CF_3)O)_n(CF_2O)_mCF_2$ COOK in water with an average molecular weight of 521 and the ratio n/m=10.

The autoclave, stirred at 470 rpm, was heated to a temperature of 60° C. A water based solution with 6 g/liter of KPS (potassium persulfate) was added in a quantity of 150 ml. The pressure was maintained at a value of 12 Bar abs by inserting TFE.

After adding 1200 g of TFE in the reactor, 220 g of the monomer $CF_2\!=\!CF\!-\!O\!-\!CF_2CF_2\!-\!SO_2F$ were added every 200 g of TFE fed to the autoclave. The reaction was stopped after 256 min by stopping the stirring, cooling the autoclave and reducing the internal pressure by venting the TFE; a total of 4000 g of TFE were fed. The produced latex had a concentration of 27.5% by weight. Part of the latex was then coagulated by freezing and thawing and the recovered polymer was washed with water and dried for 40 h at 150° C.

A film was obtained from said dry powder by heating the powder at 270° C. for 5 min in a press. A squared specimen 10×10 cm was punched off from the film and treated for 24 h at 820° C. in a KOH solution in water (10% by weight), Rinsed with pure water, and finally treated in a 20% by weight $HNO_3$ solution at ambient temperature. The film was finally washed with water. The polymer was in this way converted from the precursor (—$SO_2F$) form to the acid (—$SO_3H$) form.

After drying in vacuum at 150° C., the film was titrated with diluted NaOH. The equivalent weight of the polymer resulted to be 800 g/eq.

The remaining amount of latex was kept under nitrogen bubbling for 16 hours to strip away residual monomers from the polymerization, and then stored in a plastic tank.

COMPARATIVE EXAMPLE 2

Manufacture of a Polymer (I) Having an Equivalent Weight of 870 g/eq

Similar procedure as detailed in example 1, was followed but modifying monomer (M) amounts and operating pressure so that a latex (solids content=28.5% wt) of polymer (I) having an EW of 870 g/eq was obtained.

COMPARATIVE EXAMPLE 3

Manufacture of a Polymer (I) Having an Equivalent Weight of 950 gr/eq

Similar procedure as detailed in example 1, was followed but modifying monomer (M) amounts and operating pressure so that a latex (solids content=28% wt) of polymer (I) having an EW of 950 g/eq was obtained.

EXAMPLE 4 AND COMPARATIVE EXAMPLES 5 AND 6

Manufacture of Membranes from Polymer (I) of Examples 1 to 3

The lattices of the polymers (I) having equivalent weight 800, 870, 950 produced in the above described runs 1 to 3 were used for manufacturing membranes according to example 4, comparative example 5 and 6, respectively. Latices were firstly coagulated by freezing and thawing and the coagulated polymer (I) was washed with water and dried for 40 h at 150° C.

The dry polymer (I) was extruded on a Profile Dies 45 extruder, maintaining a head temperature of 265° C. and a stretching ratio of 12, so that a membrane film having a thickness of 40±5 microns were obtained.

The film was then hydrolyzed according to the following steps:
1. aqueous KOH 10% treatment at a temperature of 80° C. for a total time of 4 hours for the 800 EW and 870 EW membranes and 6 hours for the 950 EW membrane;
2. rinse with demineralized water at room temperature (25° C.)
3. aqueous $HNO_3$ 20% treatment at room temperature (25° C.) for 1 hour
4. rinse with demineralized water at room temperature (25° C.)

The thickness of each of the hydrolyzed membrane of polymers (I) having formula $(C_2F_4)_n(C_4F_7O_4SH)_m$ was found to be 50±5 microns.

EXAMPLE 7 AND COMPARATIVE EXAMPLES 8 AND 9

Fuel Cell Durability Tests in Dry Conditions Using Membranes from Examples 4 to 6

The membranes comprising polymer (I) obtained in examples 4 and comparative examples 5 and 6 (having, respectively, an EW of 800, 870 and 950) were assembled in a single cell (Fuel Cell Technology®) with an active area of 25 cm² and tested on a Arbin® 50 W test stand. The membranes were assembled with an E-TEK® LT250EW gas diffusion electrode having a Pt content of 0.5 mg/cm², treated with polymer (I) on the surface.

The test operating conditions were fixed as follow:
Air stoichiometry: 2.8 Air
Hydrogen utilization: 0.3 (pure hydrogen 5.5 grade);
Reactant humidity level: 66%
Cell temperature: 85° C.;
Operating pressure: 2.5 BarA;
Voltage: 0.6 V constant during the whole test, the current density value was monitored.

FIG. 1 depicts current density as a function of time obtained with the membranes according to examples 4 to 6. Abscissa represent the time in hours, while ordinate shows the current density in A/cm².

Only when operating the fuel cell with the membrane of example 4, it was possible to maintain during 2000 hours an average current density of roughly 1.1 A/cm². Membranes of comparative examples 5 and 6 were found to yield membrane failures (pinholes) after limited periods of operation.

Figure 2:
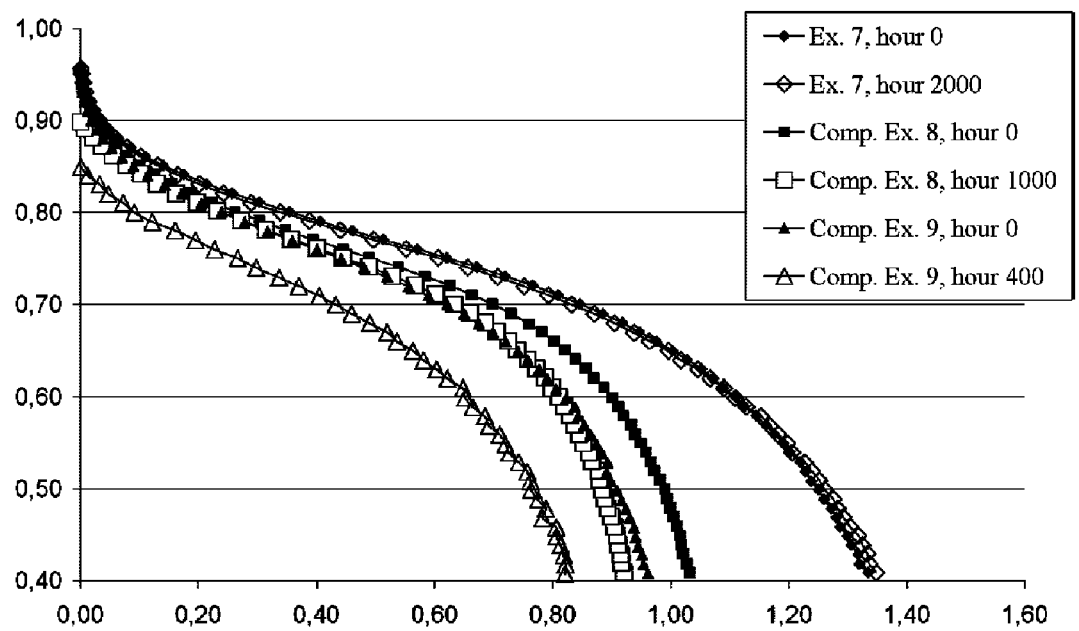

FIG. 2 depicts polarization curves for the fuel cells of examples 7 (recorded at the beginning (t=0 h) and after 2000 hours of operations), comparative example 8 (at the beginning and after 1000 hours of operations) and comparative example 9 (at the beginning and after 400 hours of operations). Abscissa is the current density in A/cm², while ordinate represents cell voltage in V.

Only when the fuel cell is operated as above detailed and comprises the membrane having EW of 800, it is possible to maintain PEMFC performances substantially unchanged during 2000 hours of operations. In other cases, even in strictly similar conditions, performances of PEMFC are sensibly depleted after limited period of time.

EXAMPLE 10 AND COMPARATIVE EXAMPLE 11

Comparison Between PEMFC Performances in Humid and Dry Conditions with Membrane of Example 4 and Comparative Example 5

Membranes from example 4 (polymer (I) having EW of 800) and comparative example 5 (polymer (I) having EW of 870) were assembled as above described in a PEMFC.

Polarization curves were then recorded either in "humid" conditions (operating conditions "A") or in "dry" conditions (operating conditions "B", according to the invention), as detailed here below:
Operating Condition A:
Air stoichiometry: 2.8 Air
Hydrogen utilization: 0.3 (pure hydrogen 5.5 grade);
Reactant humidity level: 100%
operating temperature: 75° C.;
reactants outlet pressure: 2.5 Bar Abs.
Operating condition B:
Air stoichiometry: 2.8 Air
Hydrogen utilization: 0.3 (pure hydrogen 5.5 grade);
Reactant humidity level: 50%
operating temperature: 75° C.
reactants outlet pressure: 2.5 Bar Abs.

Figure 3:
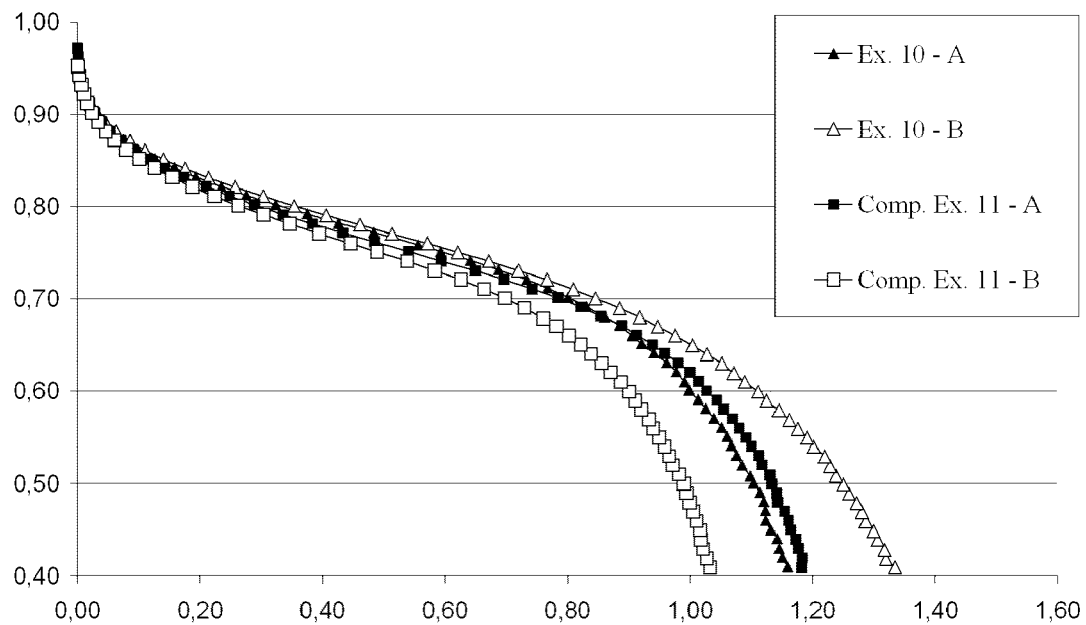

FIG. 3 depicts the polarization curves recorded in above detailed conditions. Abscissa represents current density in A/cm² and ordinate represents voltage (V).

From FIG. 3, it becomes evident that while polarization curves are strictly similar for example 10 and comparative example 11 in A conditions (i.e. with humid reactants), the same is not true when so-called "dry" conditions (B conditions) are adopted: in this latter case, while curve for example 10 (EW=800) is shifted rightwards, curve for comparative example 11 is shifted leftwards.

EXAMPLE 12

Manufacture of an Impregnated Membrane from Polymer (I) of Example 1

The polymer (I) manufactured as described in example 1 was used for the preparation of a water based dispersion, by stirring polymer (I) in an autoclave model LIMBO 350 (Buchi Glas Uster) at a temperature of 250° C., as disclosed in U.S. Pat. No. 4,433,082 (DU PONT (US)) 21 Feb. 1984. A 20% weight percent of water based dispersion was obtained.

An expanded PTFE support commercially available under the trade mark GORE-TEX® GMP 20233, having a nominal average pore diameter of 0.2 microns and a thickness of 40 microns, was mounted on a PTFE circular frame having an internal diameter of 100 mm.

The dispersion obtained as above described was added of a mixture 50/50 by volume of 1-propyl and 2-propyl alcohols to enhance film-forming capabilities until a polymer concentration of 10% was achieved. The expanded PTFE support material mounted on the frame was immersed in said aqueous-alcoholic dispersion and then dried in oven at a temperature of 130° C. for 30 minutes; this step was repeated twice so as to succeed in a complete impregnation of the support. The impregnated support was found to be transparent and colourless. A final step of high temperature treatment was done in oven at 190° C. for 20 minutes. Then, the PTFE circular frame was removed and the membrane was treated in HNO₃ 20% at 25° C. for 1 hour. An impregnated membrane comprising a polymer (I) having EW of 800 and average thickness of 20±3 microns was thus obtained.

EXAMPLE 13

Fuel Cell Performances and Durability of a PEMFC Comprising the Membrane of Example 12

The membrane produced in example 12 (800 EW) was assembled as detailed in example 7.

PEMFC was operated for 2000 hours in the following conditions:
Air stoichiometry: 2.8 Air
Hydrogen utilization: 0.3 (pure hydrogen 5.5 grade);
Reactants relative humidity: 50%;
operating temperature: 85° C.;
reactants outlet pressure: 2.5 BarA.

At the beginning of such durability test and after 2000 hours of continuous operations, conditions were briefly switched to the followings (humid conditions) (only for analytical purposes):
Air stoichiometry: 2.8 Air
Hydrogen utilization: 0.3 (pure hydrogen 5.5 grade);
reactant relative humidity: 100%;
operating temperature: 85° C.;
reactants outlet pressure: 2.5 BarA.

Figure 4:
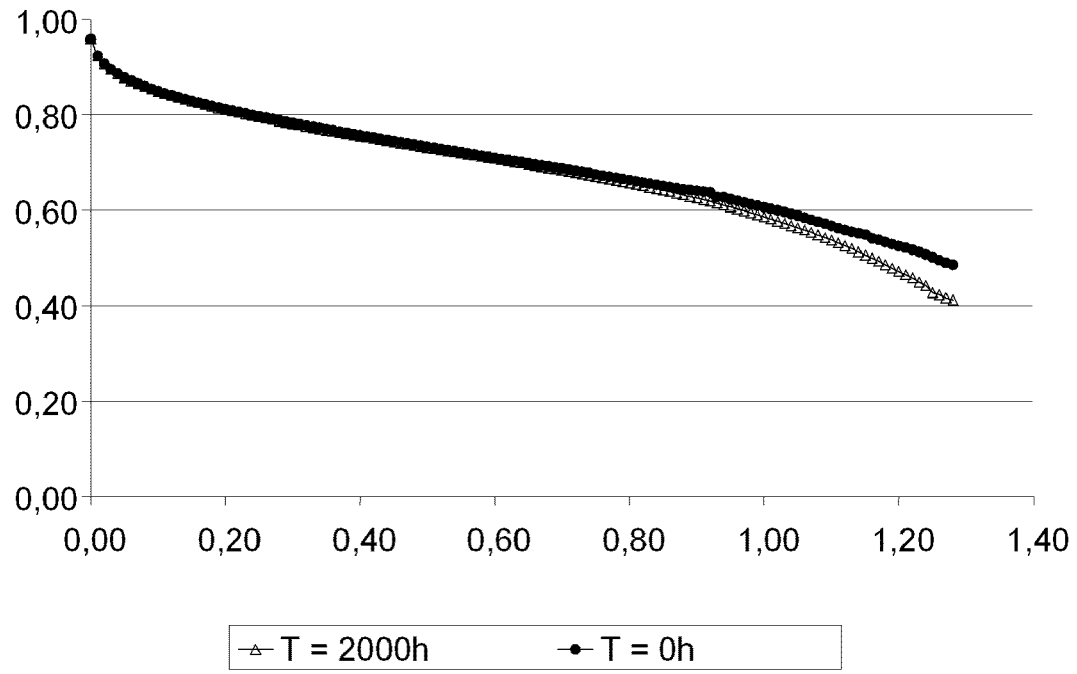

FIG. 4 depicts the polarization curves recorded in such conditions either at the beginning of the test or after 2000 hours of operations. Abscissa represents current density in A/cm² and ordinate represents voltage (V).

Comparison between the two curves shows no significant difference in behaviour, so that it can concluded that when operating the impregnated membrane in a PEMFC in above detailed conditions, it is possible to sustain for long period of time operations in so-called "dry conditions", with no membrane degradation.

The invention claimed is:
1. A process for operating a polymer electrolyte membrane fuel cell (PEMFC), said PEMFC comprising:
(a) a membrane comprising at least one fluorinated ionomer [polymer (I)] comprising recurring units derived from tetrafluoroethylene (TFE) and from at least one monomer of formula (M):

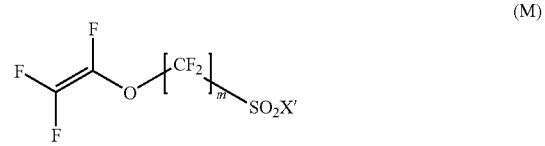

wherein m is an integer between 1 and 6 and X' is chosen among halogens (Cl, F, Br, I), —O⁻ M⁺, wherein M⁺ is a cation selected among $H^+$, $NH_4^+$, $K^+$, $Na^+$, or mixtures thereof, said polymer (I) having an equivalent weight (EW) of from 700 to 850 g/eq.;
(b) a cathode;
(c) an anode;
said process comprising:
(i) feeding gaseous reactants at the electrodes at a relative humidity of at most 66%;
(ii) maintaining an average current density between 0.05 and 1.5 A/cm$^2$; and
(iii) maintaining an average temperature of more than 65° C.

2. The process of claim 1, wherein the polymer (I) is a tetrafluoroethylene (TFE) copolymer comprising recurring units derived from TFE and from a monomer of formula (M1):

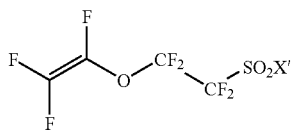
(M1)

wherein X' is chosen among halogens (Cl, F, Br, I), —O$^-$M$^+$, wherein M$^+$ is a cation selected among $H^+$, $NH_4^+$, $K^+$, $Li^+$, $Na^+$, or mixtures thereof.

3. The process according to claim 1, wherein said membrane has a thickness comprised between 10 and 60 μm.

4. The process according to claim 1, wherein the average air stoichiometry is comprised between 1.2 and 3.

5. The process according to claim 1, wherein the average hydrogen utilization is comprised between 0.25 and 1.

6. The process according to claim 1, wherein the maximum continuous period of time during which said process is operated in OCV (open circuit voltage) conditions, i.e. when the drained current is zero, is below 10 minutes.

7. The process according to claim 1, wherein said process comprises maintaining an average temperature of at most 120° C.

8. The process according to claim 1, wherein the ratio between the resistance of the membrane at −20° C. divided by the resistance of the same at 80° C. at a relative humidity of 60% is comprised between 2 and 15.

9. The process according to claim 8, wherein said ratio is comprised between 3 and 10.

* * * * *